US012602590B2

(12) United States Patent
Kim et al.

(10) Patent No.: US 12,602,590 B2
(45) Date of Patent: Apr. 14, 2026

(54) ARTIFICIAL INTELLIGENCE SYSTEM THAT COLLECTS INTERACTIVE PICTURE DATA FOR BUILDING ARTIFICIAL INTELLIGENCE DATA AND ANALYZES CORRELATION BETWEEN ART COMPETENCY AND ACADEMIC ACHIEVEMENT

(71) Applicant: I-SCREAM ARTS CO., LTD., Seoul (KR)

(72) Inventors: Ji-Hoon Kim, Seoul (KR); Seung-Ah Kim, Sejong (KR)

(73) Assignee: I-SCREAM ARTS CO., LTD., Seoul (KR)

( * ) Notice: Subject to any disclaimer, the term of this patent is extended or adjusted under 35 U.S.C. 154(b) by 545 days.

(21) Appl. No.: 18/350,956

(22) Filed: Jul. 12, 2023

(65) Prior Publication Data

US 2023/0351199 A1 Nov. 2, 2023

Related U.S. Application Data

(63) Continuation of application No. PCT/KR2021/016759, filed on Nov. 16, 2021.

(30) Foreign Application Priority Data

Sep. 3, 2021 (KR) ......................... 10-2021-0117708
Nov. 11, 2021 (KR) ......................... 10-2021-0154400

(51) Int. Cl.
*G06F 21/00* (2013.01)
*G06N 3/045* (2023.01)
*G06N 3/091* (2023.01)

(52) U.S. Cl.
CPC ............. *G06N 3/091* (2023.01); *G06N 3/045* (2023.01)

(58) Field of Classification Search
CPC ...... G06N 3/091; G06N 3/045; G06N 3/0464; G06N 3/044; G06N 3/08; A61B 5/00;
(Continued)

(56) References Cited

U.S. PATENT DOCUMENTS

| | | | |
|---|---|---|---|
| 11,682,152 B1* | 6/2023 | Blumer | H04L 65/403 |
| | | | 345/619 |
| 2020/0302296 A1* | 9/2020 | Miller | G09B 5/00 |

(Continued)

FOREIGN PATENT DOCUMENTS

| | | |
|---|---|---|
| KR | 10-1524753 B1 | 6/2015 |
| KR | 10-1898385 B1 | 9/2018 |

(Continued)

*Primary Examiner* — William A Corum, Jr.
(74) *Attorney, Agent, or Firm* — NKL Law; Jae Youn Kim

(57) ABSTRACT

The present disclosure relates to a technique that collects picture data created by a user and predicts an academic achievement of the user through the picture data and an artificial intelligence system that collects interactive picture data for building artificial intelligence data and analyzes correlation between an art competency and an academic achievement according to an exemplary embodiment of the present disclosure includes a picture data collector which provides an interactive environment to a user to induce the user to perform a process of labeling an object included in picture data created by the user and collects picture data including an object whose class is annotated by the labeling process; an academic achievement prediction unit which evaluates an art competency of the user using the picture data and predicts an academic achievement of the user through a learning competency with a high correlation with an art competency of the user; and a database in which picture data to be used to evaluate an art competency of the user by the academic achievement prediction unit is stored.

11 Claims, 3 Drawing Sheets

(58) Field of Classification Search
CPC .......... A61B 5/16; G06V 10/24; G16H 10/20;
G16H 20/70; G16H 50/20
See application file for complete search history.

(56) References Cited

U.S. PATENT DOCUMENTS

2021/0405951 A1* 12/2021 Kumar .................. G06F 3/1423
2023/0346280 A1* 11/2023 Kim ........................ A61B 5/165
2023/0351907 A1* 11/2023 Kim ......................... G09B 5/02
2025/0363580 A1* 11/2025 Squires ............... G06Q 50/205

FOREIGN PATENT DOCUMENTS

KR          10-1926836  B1     12/2018
KR          10-1942444  B1      1/2019

* cited by examiner

10

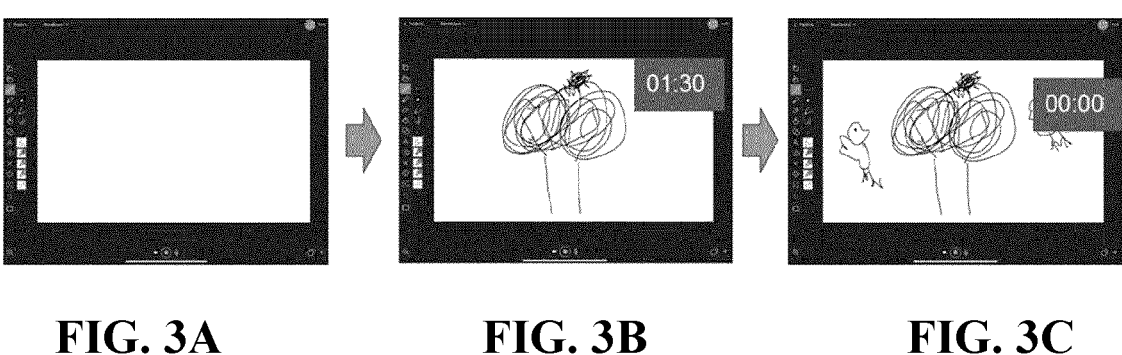
FIG. 3A                    FIG. 3B                    FIG. 3C
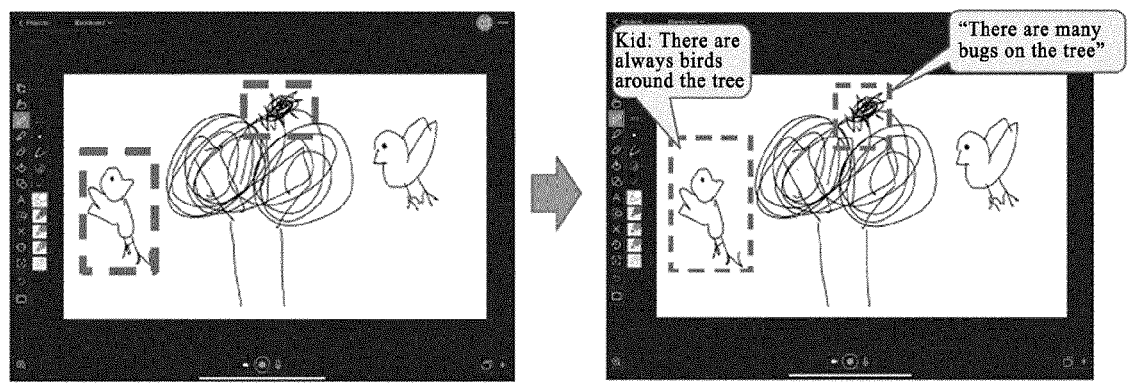
FIG. 4A                              FIG. 4B

ARTIFICIAL INTELLIGENCE SYSTEM THAT COLLECTS INTERACTIVE PICTURE DATA FOR BUILDING ARTIFICIAL INTELLIGENCE DATA AND ANALYZES CORRELATION BETWEEN ART COMPETENCY AND ACADEMIC ACHIEVEMENT

TECHNICAL FIELD

The present disclosure relates to an artificial intelligence system which collects interactive picture data for building artificial intelligence data and analyzes correlation between an art competency and an academic achievement, and more particularly, to a technique of collecting picture data generated by a user and predicting an academic achievement of the user through the picture data.

BACKGROUND ART

A one-way manual labeling tool has problems in that it takes a lot of time and cost to build artificial intelligence data. Further, in order to collect artificial intelligence learning data in the field of art, a learner who creates picture data needs to actively perform labeling. However, a passive learner may not perform a sufficient labeling task after creating the picture data and every examiner may differently recognize the learner's intention from the learner's picture data or skip the analysis without making a judgment even though there is a strong intention.

In the meantime, an examiner who determines a learner's intention with picture data may be an expert such as a clinical psychologist or an educator and analyzes the object of the picture data to determine a subjective competency of the learner.

However, since the subjective competency evaluation of the examiner has a large deviation, the reliability of the competency evaluation is low. Further, due to the lack of reliability of the competency evaluation, it is difficult to determine an art competency of the user.

DISCLOSURE

Technical Problem

An object of the present disclosure is to provide an artificial intelligence system which collects interactive picture data for building artificial intelligence data and analyzes correlation between an art competency and an academic achievement which allows an artificial intelligence model to figure out a user's intention to determine objects which constitute picture data and requests a user to record intention for an object to perform actively labeling of the object and reduces the deviation in interpretation of the meaning of the picture data through the objective judgment of the artificial intelligence model, rather than a subjective judgment of a manager who is an educator.

Further, an object of the present disclosure is to provide an artificial intelligence system which collects interactive picture data for building artificial intelligence data and analyzes correlation between an art competency and an academic achievement to objectively judge an art competency of a user from the picture data using an artificial intelligence model and predict an academic achievement of the user based on the art competency.

Technical objects to be achieved in the present disclosure are not limited to the aforementioned technical objects, and another not-mentioned technical object will be clearly understood by those skilled in the art from the description below.

Technical Solution

In order to solve the above-described problem, an artificial intelligence system that collects interactive picture data for building artificial intelligence data and analyzes correlation between an art competency and an academic achievement according to an exemplary embodiment of the present disclosure may include a picture data collector which provides an interactive environment to a user to induce the user to perform a process of labeling an object included in picture data created by the user and collects picture data including an object whose class is annotated by the labeling process; an academic achievement prediction unit which evaluates an art competency of the user using the picture data and predicts an academic achievement of the user through a learning competency with a high correlation with an art competency of the user; and a database in which picture data to be used to evaluate an art competency of the user by the academic achievement prediction unit is stored.

Further, the picture data collector may include: a user interface for providing an interactive environment to the user; an object extractor which is trained with a first artificial intelligence model to extract an object from picture data created by the user through the user interface; a text converter which converts a voice recorded to explain the object by the user into a text after generating the object in the picture data; and an object labeling unit which is trained with a second artificial intelligence model which extracts a sentence or a phrase from the text to summarize the text, annotates a class of the object by labeling the object with a key word which forms the sentence or the phrase, and transmits the picture data of the user in which the class of the object is annotated to the database.

The first artificial intelligence model may set and extract a boundary area in every position where the object may be disposed, from the picture data to generate a rectangular coordinate for the position of the object, modify an image in the boundary area in accordance with a size of a CNN input layer, and then extract a feature vector and annotate the class through the extraction of the feature vector.

During a process of converting the voice into the text in the text converter, if each word included in the sentence or the phrase that forms the text is a standard language, the object labeling unit may annotate the class of the object based on extractive summarization of the second artificial intelligence model.

The object labeling unit is trained by a third artificial intelligence model to abstractively summarize the text by generating a new sentence which is not present in the text based on a key context of the test and annotate the class of the object by labeling the object with a word which forms the sentence.

During a process of converting the voice into the text in the text converter, if one or more words which are not standard language are included in the sentence or the phrase that forms the text, the object labeling unit may annotate the class of the object based on abstractive summarization of the third artificial intelligence model.

The text converter may receive a recording file in which the voice is recorded, through the user interface and preprocess the recording file by removing a noise recorded together in the recording file during the process of recording the voice, extract the voice of the recording file as a text, and then modify the words of the text in accordance with the standard language.

The academic achievement prediction unit may include: a search unit which searches for picture data of the user in which a class of the object transmitted from the object labeling unit to the database is annotated, from the database; an evaluation unit which evaluates an art competency of the user from picture data of a user in which a class of the object searched by the search unit is annotated; and a prediction unit which when information about a learning competency with a high correlation with an art competency of the user evaluated by the evaluation unit is searched by the search unit, receives information about the learning competency from the search unit and predicts an academic achievement of the user based on information about the learning competency.

When the search unit searches for the picture data of the user in which the class of the object is annotated from the database and receives information about the art competency of the user from the evaluation unit, the search unit may be trained with a fourth artificial intelligence model to search a learning competency with a high correlation with an art competency of the user from the database.

Further, the search unit may be trained with the fourth artificial intelligence model to search for actual photograph data of the object to be compared, for the evaluation unit to evaluate the art competency of the user, from the database to transmit the data to the evaluation unit.

The evaluation unit may be trained with a fifth artificial intelligence model to compare the picture data of the user in which the class of the object is annotated and actual photograph data of the object, and rate a score to the picture data of the user in which the class of the object is annotated, based on a degree of describing the object of the actual photograph data by the object of the picture data, and evaluate the art competency of the user based on the score.

Further, the prediction unit may be trained with a sixth artificial intelligence model to predict an academic achievement of the user based on information about the learning competency when the learning competency with a high correlation with the art competency of the user calculated based on the score is received from the search unit.

Advantageous Effects

According to the present disclosure, labeling of the active object is induced to the user to build artificial intelligence data and a deviation in the interpretation of the meaning of the picture data is reduced through the objective judgment of the artificial intelligence model.

Further, according to the present disclosure, the academic achievement is predicted based on the art competency to induce the improvement of the insufficient academic achievement through the art activity.

Further, according to the present disclosure, the art competency is evaluated using the artificial intelligence model to reduce a deviation, a time, and a cost for the competency evaluation.

A technical object to be achieved in the present disclosure is not limited to the aforementioned effects, and another not-mentioned effect will be obviously understood by those skilled in the art from the description below.

DESCRIPTION OF DRAWINGS

FIGS. 3A-4B are views illustrating a picture data collecting process of a picture data collector.

BEST MODE

Figure 1:
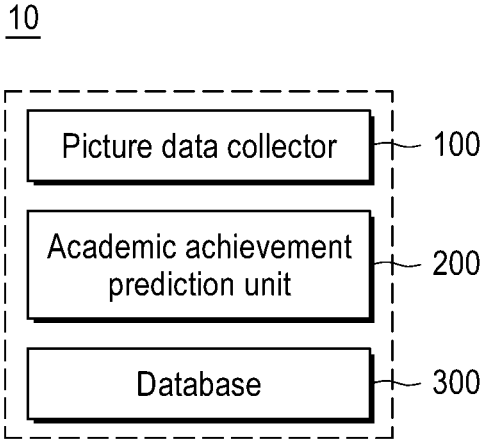
FIG. 1 is a block diagram schematically illustrating an artificial intelligence system according to an exemplary embodiment of the present disclosure.

Hereinafter, exemplary embodiments of the present disclosure will be described more fully with reference to the accompanying drawings for those skilled in the art to easily implement the present disclosure. Description of the present disclosure is just an embodiment for structural and functional description so that the scope of the present disclosure is not interpreted to be limited by the embodiment described in the specification. That is, the embodiment may be modified in various forms so that it is understood that the scope of the present disclosure has equivalents which are capable of implementing the technical spirit. Further, it does not mean that the specific embodiment includes the object or effect proposed in the present disclosure or includes only the effect so that it is not understood that the scope of the present disclosure is limited thereby.

In the meantime, meanings of terms described in the present disclosure can be understood as follows.

The terms "first" or "second" are used to distinguish one component from the other component so that the scope should not be limited by these terms. For example, a first component may be referred to as a second component, and similarly, a second component may be referred to as a first component. It should be understood that, when it is described that an element is "connected" to another element, the element may be directly connected to the other element or connected to the other element through a third element. In contrast, it should be understood that, when it is described that an element is "directly connected" to another element, no element is present between the element and the other element. Other expressions which describe the relationship between components, that is, "between" and "directly between", or "adjacent to" and "directly adjacent to" need to be interpreted in the same manner.

Unless the context apparently indicates otherwise, it should be understood that terms "include" or "have" indicate that a feature, a number, a step, an operation, a component, a part, or the combination thereof described in the specification is present, but do not exclude a possibility of presence or addition of one or more other features, numbers, steps, operations, components, parts, or combinations thereof, in advance.

Unless they are contrarily defined, all terms used herein have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present disclosure.

The artificial intelligence system 10 that collects interactive picture data for building artificial intelligence data and analyzes correlation between an art competency and an academic achievement according to the exemplary embodiment of the present disclosure (hereinafter, referred to as "artificial intelligence system 10") is a system that collects picture data created by a user 1 and predicts an academic achievement of the user 1 through the picture data and components therefor are as follows.

In the present disclosure, the user 1 is not limited, but may be low-educated children of first to sixth graders of the elementary school to induce active labeling of objects which form the picture data.

FIG. 1 is a block diagram schematically illustrating an artificial intelligence system according to an exemplary embodiment of the present disclosure.

Referring to FIG. 1, the artificial intelligence system 10 according to the exemplary embodiment of the present disclosure includes a picture data collector 100 that collects picture data created by the user to build artificial intelligence data, an academic achievement prediction unit 200 that predicts academic achievement of the user through the picture data collected by the picture data collector 100, and a database 300 for storing the picture data.

The picture data collector 100 provides an interactive environment to the user 1 to induce the user 1 to perform a process of labelling objects included in the picture data created by the user 1 and collects picture data including objects whose classes are annotated by the labeling process and components thereof are as follows.

Figure 2:
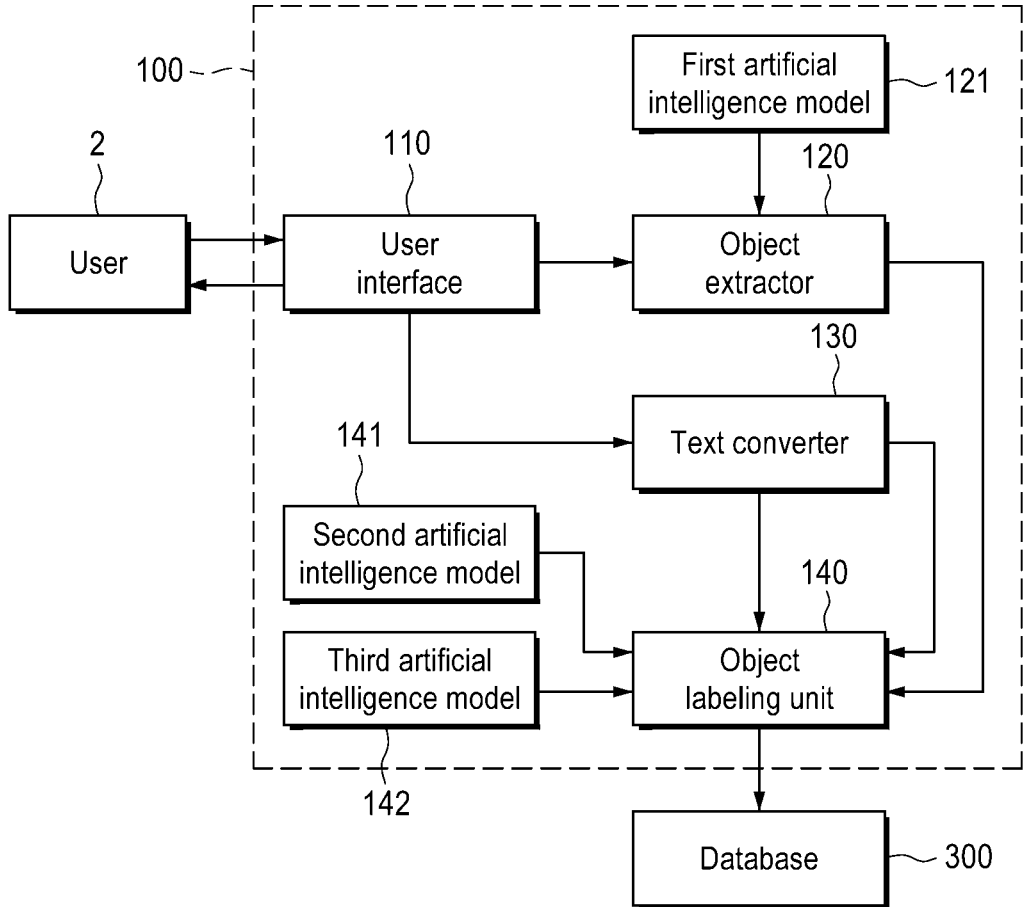
FIG. 2 is a block diagram schematically illustrating a picture data collector illustrated in FIG. 1.

FIG. 2 is a block diagram schematically illustrating a picture data collector illustrated in FIG. 1.

Referring to FIG. 2, the picture data collector 100 includes a user interface 110, an object extractor 120, a text converter 130, and an object labeling unit 140.

The user interface 110 is a concept including a hardware device and a software program to provide an environment in which a user 1 interacts with the artificial intelligence system 10 and receive an instruction from the user 1 and convert the instruction into electronic data. For example, an input device such as a keyboard, a mouse, and a touch pen, an output device such as a display, and a drawing application which processes data, such as contours and colors, input through the input device to display the data on the output device in real time may be included.

That is, the artificial intelligence system 10 interacts with the user 1 through the user interface 110 so that the picture data 100 may be input from the user 1.

At this time, the picture data is data which is generated by the user 1 on a display screen provided in the artificial intelligence system 10 and is formed by a combination of objects created in a position designated by the user 1.

Further, the object of the picture data may be information including an item which serves as an evaluation element of the art psychological examination.

Here, the art psychological examination may be an HTP test which asks to draw at least one of a house, a tree, and a person which is an object and then analyzes a psychological state of the user from information such as a shape, a color, and a position of the picture. However, the method is not limited so as to evaluate the art competency and predict the academic achievement of the user 1 by means of picture data which is formed of a combination of various objects. If the object is a house, as an item constituting the object, house frames (a roof, a wall, a chimney, etc.), windows, and doors may be included and if the object is a tree, stems, roots, leaves, fruits, and the like may be included.

The object extractor 120 is trained by a first artificial intelligence model 121 to extract an object from picture data created by the user 1 through the user interface 110.

The first artificial intelligence model 121 sets and extracts a quadrangular boundary area in every position where the object may be disposed, from the picture data based on a region proposal to generate a quadrangular coordinate for the position of the object, modifies an image in the boundary area in accordance with a size of a CNN input layer, and then extracts a feature vector and annotates the class through the extraction of the feature vector.

When the object extractor 120 extracts an object, a boundary area including the object extracted by the object extractor 120 is generated on the picture data.

When the boundary area including the object extracted by the object extractor 120 is generated on the picture data, the text converter 130 requests the user 1 to record a voice for explaining an intention of the object and when the user 1 records the voice for explaining an intention of the object extracted by the object extractor 120 through the user interface 110, converts the recorded voice into a text.

That is, the user interface 110 of the present disclosure desirably includes a recording program (for example, speech to text) to record the voice which explains the intention of the object by the user 1.

Further, the text converter 130 receives a recording file in which the voice of the user 1 is recorded, from the recording program of the user interface 110 and preprocesses the recording file by removing a noise recorded together in the recording file during the process of recording the voice of the user 1, and extracts the voice of the recording file as a text, and then modifies the words of the text in accordance with the standard language.

The text converter 130 may include an artificial intelligence model trained by a database in which the standard language is stored, such as a Korean dictionary or a program to modify (convert) the text extracted from the voice of the recording file into a standard language.

The object labeling unit 140 labels the object based on the text extracted by the text converter 130 to annotate the class of the object.

The object labeling unit 140 is trained by a second artificial intelligence model 141 and a third artificial intelligence model 142 to label the object and annotate the class of the object based on the text.

Here, the second artificial intelligence model 141 is an artificial intelligence model trained with extractive summarization that extracts a sentence or a phrase from the text to summarize the text and annotates the class of the object by labeling the object with a key word which forms the sentence or the phrase of the text.

Further, the third artificial intelligence model 142 is an artificial intelligence model which is trained to create a new sentence which is not in the text based on a key context of the text to abstractively summarize the text and annotates the class of the object by labeling the object with a word which forms the created sentence.

The object labeling unit 140 is desirably actually divided into two object labeling units to be trained with the second artificial intelligence model 141 and the third artificial intelligence model 142 which are different from each other.

The object labeling unit 140 trained with the second and third artificial intelligence models 141 and 142 may label the object using the second artificial intelligence model 141 or label the object using the third artificial intelligence model 142 according to a result of the process of converting a voice of the user 1 into the text by the text converter 130.

As a specific example, when each word included in the sentence or the phrase which forms the text is a standard language during the process of converting the voice of the user 1 into the text by the text converter 130, that is, when the text is formed of a standard language-based perfect sentence, the object labeling unit 140 may annotate the class of the object based on the extractive summarization of the second artificial intelligence model 141.

As another specific example, when one or more words which are not a standard language are included in the sentence or the phrase which forms the text during the process of converting the voice of the user 1 into the text by the text converter 130, that is, when the text is formed of a sentence including a sentence or a phrase which is not a standard language, the object labeling unit 140 may annotate the class of the object based on the abstractive summarization of the third artificial intelligence model 142.

In the meantime, the object labeling unit 140 annotates the class of the object by the second artificial intelligence model 141 or the third artificial intelligence model 142 and then transmits the picture data of the user 1 whose class of the object is annotated to the database 300.

As described above, a process of collecting the picture data of the user 1 whose class of the object is annotated by a picture data collector 100 is as follows.

FIGS. 3A-44B are views illustrating a picture data collecting process of a picture data collector.

When it is requested for the user to create the picture data through the user interface 110, a controller of the picture data collector 100 may output a window for creating picture data on a display screen as illustrated in FIG. 3A.

Next, the controller of the picture data collector 100 outputs a predetermined limit time (for example, 90 seconds) on a window on which the picture data is created as illustrated in FIGS. 3B and 3C and the user 1 draws objects within the limited time to complete the picture data with the combination of the objects.

Next, the object extractor 120 may extract an object from the picture data created by the user 1, as illustrated in FIG. 4A.

Thereafter, as illustrated in FIG. 4B, the user 1 generates a recording file by recording a voice for explaining an intention of an object extracted from the object extractor 120, the text converter 130 converts the voice of the user 1 included in the recording file, and transmits the picture data of the user 1 whose class of the object is annotated after annotating the class of the object using the text to the database 300.

The picture data of the user 1 whose class of the object is annotated may be stored in the database 300 through the process of collecting picture data.

Figure 5:
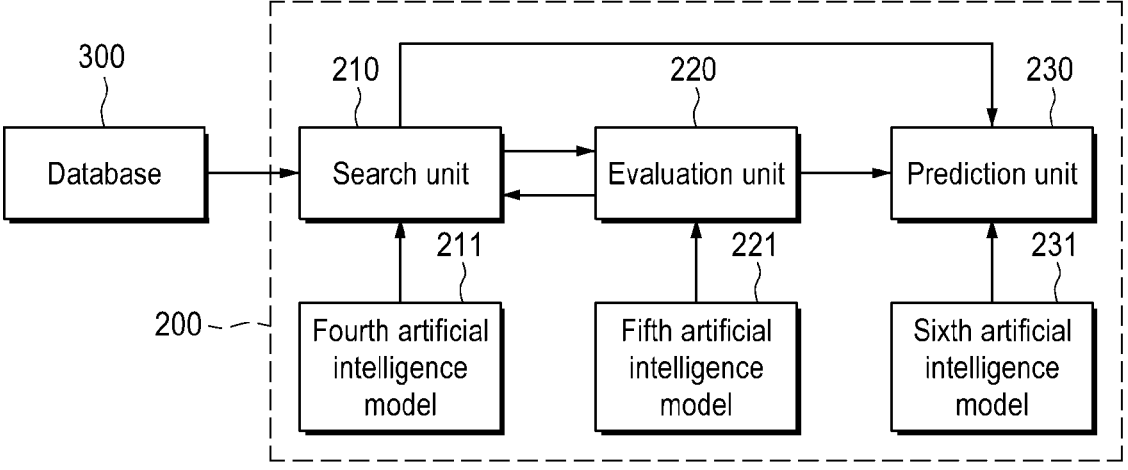
FIG. 5 is a block diagram schematically illustrating an academic achievement prediction unit illustrated in FIG. 1.

FIG. 5 is a block diagram schematically illustrating an academic achievement prediction unit illustrated in FIG. 1.

Referring to FIG. 5, an academic achievement prediction unit 200 includes a search unit 210, an evaluation unit 220, and a prediction unit 230 for predicting the academic achievement using picture data of the user 1 in which a class of the object stored in the database 300 is annotated.

The search unit 210 is trained by a fourth artificial intelligence model 211 to search for the picture data of the user 1 in which a class of an object transmitted from the object labeling unit 140 to the database 300 is annotated, from the database 300.

Further, when information about an art competency of the user 1 is received from the evaluation unit 220, the search unit 210 may search for a learning competency with a high correlation with the art competency of the user from the database 300.

Here, the art competency may include aesthetic sensibility that understands and expresses one's emotion through perception of various objects and phenomena and internalizes aesthetic values while responding to aesthetic experiences, a visual communication ability that understands and interprets image information and visual media from a changing visual culture and visually communicates through creation and criticism using them, a creativity and convergence ability that creatively expresses one's feelings and thoughts and rationally solves various problems confronted during the art activities by linking and converting art with knowledges and experiences in various fields, an ability to understand an art culture that understands and respects pluralistic values of the art culture with an flexible and open attitude, and an self-initiated art learning ability that develops and reflects on oneself while voluntarily and proactively participating in art activities, and understands, respects, considers, and cooperates the thoughts and feelings of others, during the process.

Further, the learning competency is a competency pursued by the national curriculum and includes self-management competency, knowledge information processing competency, creative thinking competency, aesthetic sensibility competency, communication competency, and community competency and may be calculated as scores according to each competency, based on 100 points.

That is, the fourth artificial intelligence model 211 is trained to search for picture data of the user 1 in which a class of the object is annotated and search for a learning competency having a high correlation with the art competency of the user 1 from the database 300 and specifically, refers to a learning model which is configured by a plurality of layers to implement a similar function of the human neural network. For example, an artificial neural network model, such as a recurrent neural network (RNN), a convolutional neural network (CNN), and an attention-based model, may be used.

Moreover, the search unit 210 is trained by the fourth artificial intelligence model 211 to search for actual photograph data of an object to be compared, for the evaluation unit 220, to evaluate the art competency of the user 1 from the database 300 to transmit the actual photograph data to the evaluation unit 220.

That is, in the database 300, actual photograph data of an object which is drawn on the display screen of the artificial intelligence system 10, by the user 1 to create the picture data is desirably stored in advance and the database may be updated by a manager (educator).

The evaluation unit 220 is trained by the fifth artificial intelligence model 221 to evaluate an art competency of the user 1 from the picture data of the user 1 in which a class of the object searched by the search unit 210 is annotated.

The fifth artificial intelligence model 221 is trained to compare the picture data of the user 1 in which the class of the object is annotated and actual photograph data of the object, and rate a score to the picture data of the user 1 in which the class of the object is annotated, based on a degree of describing the object of the actual photograph data by the object of the picture data, and evaluate the art competency of the user based on the score. Specifically, the fifth artificial intelligence model 221 refers to a learning model which is configured by a plurality of layers to implement a similar function of the human neural network. For example, an artificial neural network model, such as a recurrent neural network (RNN), a convolutional neural network (CNN), and an attention-based model, may be used.

When the result of the picture data is considered as a means of expression, under the assumption that in the case of the picture based on the fact description, the result varies depending on the usual observation ability, task compliance, and concentration, the evaluation unit 220 may evaluate the art competency of the user 1 from the picture data of the user 1 in which the class of the object is annotated and rate a high score to picture data which similarly depicts the object of the actual photograph data stored in the database 300 through the learning with the fifth artificial intelligence model 221.

When information about the learning competency with a high correlation with the art competency of the user 1 evaluated by the evaluation unit 220 is searched by the search unit 210, the prediction unit 230 is trained with the sixth artificial intelligence model 231 to receive information about the learning competency from the search unit 210 and predict the academic achievement of the user 1 based on the information about the learning competency.

Here, the academic achievement is calculated in the form of score similar to the learning competency, but unlike the learning competency, the academic achievement refers to a result of education for students, teachers, and educational institutions to achieve an educational goal and may be calculated to have different scores depending on the intelligence or inclination of individuals.

The sixth artificial intelligence model 231 is trained to predict the academic achievement of the user 1 based on the learning competency and specifically, refers to a learning model configured by a plurality of layers to implement a function similar to a human neural network and an artificial neural network model such as a recurrent neural network (RNN), a convolutional neural network (CNN), and an attention-based model may be used.

The academic achievement prediction unit 200 may transmit information about learning achievement of the user 1 to the database 300 so as to output the predicted academic achievement of the user 1 on a display screen of the artificial intelligence system 10 to be provided to the user 1.

Further, the academic achievement prediction unit 200 may transmit information about the academic achievement of the user 1 to a terminal of a manager to allow the manager who is an educator to analyze the academic achievement of the user 1 to derive an art activity that improves the insufficient academic achievement. At this time, the artificial intelligence system 10 desirably includes a communication unit to transmit information about the academic achievement of the user 1 to a terminal of the manager and when the information about the art activity which improves the academic achievement of the user 1 is received from the terminal of the manager, may provide the information to the user 1.

In the meantime, the first artificial intelligence model 121, the second artificial intelligence model 141, the third artificial intelligence model 132, the fourth artificial intelligence model 211, the fifth artificial intelligence model 221, and the sixth artificial intelligence model 231 provided in the artificial intelligence system 10 according to the exemplary embodiment of the present disclosure are distinguished for the convenience of description of the artificial intelligence technology. However, in terms of service, the artificial intelligence models may be implemented by a converged artificial intelligence model to reduce the number of artificial intelligence models and may be replaced with meta information (sensor information) or a rule-based model.

Moreover, the artificial intelligence system 10 according to the exemplary embodiments of the present disclosure may be implemented by an application or implemented in the form of a program command which may be executed through various computer components to be recorded in a computer readable recording medium. The computer readable recording medium may include solely a program command, a data file, and a data structure or a combination thereof.

Examples of the computer readable recording medium include magnetic media such as a hard disk, a floppy disk, or a magnetic tape, optical recording media such as a CD-ROM or a DVD, magneto-optical media such as a floptical disk, and a hardware device which is specifically configured to store and execute the program command such as a ROM, a RAM, and a flash memory.

As described above, the detailed description of the exemplary embodiments of the disclosed present disclosure is provided such that those skilled in the art implement and carry out the present disclosure. While the present disclosure has been described with reference to the preferred embodiments, it will be understood by those skilled in the art that various changes and modifications of the present disclosure may be made without departing from the spirit and scope of the disclosure. For example, those skilled in the art may use configurations disclosed in the above-described exemplary embodiments by combining them with each other. Therefore, the present disclosure is not intended to be limited to the above-described exemplary embodiments but to assign the widest scope consistent with disclosed principles and novel features.

The present disclosure may be implemented in another specific form within the scope without departing from the technical spirit and essential feature of the present disclosure. Therefore, the detailed description should not restrictively be analyzed in all aspects and should be exemplarily considered. The scope of the present disclosure should be determined by rational interpretation of the appended claims and all changes are included in the scope of the present disclosure within the equivalent scope of the present disclosure. The present disclosure is not intended to be limited to the above-described exemplary embodiments but to assign the widest scope consistent with disclosed principles and novel features. Further, claims having no clear quoting relation in the claims are combined to configure the embodiment or may be included as new claims by correction after application.

The invention claimed is:

1. An artificial intelligence system that collects interactive picture data for building artificial intelligence data and analyzes correlation between an art competency and an academic achievement, comprising:

a picture data collector which provides an interactive environment to a user to induce the user to perform a process of labeling an object included in picture data created by the user and collects the picture data including the object whose class is annotated by the labeling process;

an academic achievement prediction processor which evaluates the art competency of the user using the picture data and predicts the academic achievement of the user through a learning competency with a correlation with the art competency of the user; and a database in which the picture data to be used to evaluate the art competency of the user by the academic achievement prediction processor is stored, wherein the picture data collector includes:

a user interface for providing the interactive environment to the user;

an object extractor which is trained with a first artificial intelligence model to extract the object from the picture data created by the user through the user interface;

a text converter which converts a voice recorded to explain the object by the user into a text after generating the object in the picture data; and an object labeling processor which is trained with a second artificial intelligence model which extracts a sentence or a phrase from the text to summarize the text, annotates the class of the object by labeling the object with a key word which forms the sentence or the phrase, and transmits the picture data of the user in which the class of the object is annotated to the database.

2. The artificial intelligence system of claim 1, wherein the first artificial intelligence model sets and extracts a boundary area in a position where the object is disposed, from the picture data to generate a quadrangular coordinate for the position of the object and modifies an image in the boundary area in accordance with a size of a CNN input layer and then extracts a feature vector and annotates the class of the object through the extraction of the feature vector.

3. The artificial intelligence system of claim 1, wherein during the converting of the voice into the text in the text converter, if each word included in the sentence or the phrase that forms the text is a standard language, the object labeling processor annotates the class of the object based on extractive summarization of the second artificial intelligence model.

4. The artificial intelligence system of claim 1, wherein the object labeling processor is trained by a third artificial intelligence model to abstractively summarize the text by generating a new sentence which is not present in the text based on a key context of the text and annotate the class of the object by labeling the object with the key word which forms the sentence.

5. The artificial intelligence system of claim 4, wherein during the converting of the voice into the text in the text converter, if one or more words which are not standard language are included in the sentence or the phrase that forms the text, the object labeling processor annotates the class of the object based on abstractive summarization of the third artificial intelligence model.

6. The artificial intelligence system of claim 1, wherein the text converter receives a recording file in which the voice is recorded, through the user interface and preprocesses the recording file by removing a noise recorded together in the recording file during the process of recording the voice, extracts the voice of the recording file as the text, and then modifies the words of the text in accordance with a standard language.

7. The artificial intelligence system of claim 1, wherein the academic achievement prediction processor includes:

a search processor which searches for the picture data of the user in which the class of the object transmitted from the object labeling processor to the database is annotated from the database;

an evaluation processor which evaluates the art competency of the user from the picture data of the user in which the class of the object searched by the search processor is annotated; and a prediction processor which when information about the learning competency with the correlation with the art competency of the user evaluated by the evaluation processor is searched by the search processor, receives the information about the learning competency from the search processor, and predicts the academic achievement of the user based on the information about the learning competency.

8. The artificial intelligence system of claim 7, wherein when the search processor searches for the picture data of the user in which the class of the object is annotated from the database and receives the information about the art competency of the user from the evaluation processor, the search processor is trained with a fourth artificial intelligence model to search the learning competency with the correlation with the art competency of the user from the database.

9. The artificial intelligence system of claim 8, wherein the search processor is trained with the fourth artificial intelligence model to search for actual photograph data of the object to be compared, for the evaluation processor to evaluate the art competency of the user, from the database to transmit the data to the evaluation processor.

10. The artificial intelligence system of claim 9, wherein the evaluation processor is trained with a fifth artificial intelligence model to compare the picture data of the user in which the class of the object is annotated and the actual photograph data of the object, and rate a score to the picture data of the user in which the class of the object is annotated, based on a degree of describing the object of the actual photograph data by the object of the picture data, and evaluate the art competency of the user based on the score.

11. The artificial intelligence system of claim 10, wherein the prediction processor is trained with a sixth artificial intelligence model to predict the academic achievement of the user based on the information about the learning competency when the learning competency with the correlation with the art competency of the user calculated based on the score is received from the search processor.

\* \* \* \* \*